US012655764B2

(12) United States Patent
   Bialka

(10) Patent No.: US 12,655,764 B2
(45) Date of Patent: Jun. 16, 2026

(54) METHODS FOR RE-ESTABLISHING COOLING HOLES IN COMPONENTS HAVING DEFORMATION

(71) Applicant: RTX CORPORATION, Farmington, CT (US)

(72) Inventor: Derek James Bialka, Ellington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/663,972

(22) Filed: May 14, 2024

(65) Prior Publication Data

US 2025/0354493 A1     Nov. 20, 2025

(51) Int. Cl.
   *F01D 5/00* (2006.01)
   *B23P 6/00* (2006.01)
   *F01D 5/28* (2006.01)

(52) U.S. Cl.
   CPC .............. *F01D 5/005* (2013.01); *B23P 6/002* (2013.01); *F01D 5/288* (2013.01); *B23P 2700/06* (2013.01); *F05D 2230/13* (2013.01); *F05D 2230/80* (2013.01)

(58) Field of Classification Search
   CPC ....................................................... B23P 6/002
   See application file for complete search history.

(56) References Cited

U.S. PATENT DOCUMENTS 6,380,512 B1     4/2002  Emer
6,909,800 B2 *   6/2005  Vaidyanathan ......... F01D 5/005
                                                        250/336.1

9,403,245 B2     8/2016  Arjakine et al.
9,598,979 B2 *   3/2017  Reed ....................... F23R 3/002
9,817,389 B2 *  11/2017  Rhodes .............. G05B 19/4099
10,471,552 B2 * 11/2019  Raulerson ............... F01D 25/12
10,815,796 B2   10/2020  Burd et al.
11,000,925 B2 *  5/2021  Martin ................... B22D 25/02
11,840,032 B2   12/2023  Rahman et al.
(Continued)

FOREIGN PATENT DOCUMENTS

EP            2950942 B1     6/2019

OTHER PUBLICATIONS

European Search Report dated Oct. 17, 2025 issued in corresponding application 25176355.3.

*Primary Examiner* — Sarang Afzali
(74) *Attorney, Agent, or Firm* — Millen, White, Zelano & Branigan P.C.; William F. Nixon

(57)     ABSTRACT

A system includes a laser drilling apparatus having a laser to drill into coating layers of a component. The component includes cooling holes through a substrate and an existing layer. The existing coating layer is stripped from the component. The locations of the cooling holes are mapped using a coordinate measurement machine that generates a macro file of the locations. The macro file is loaded onto the laser drilling apparatus. A new coating layer is applied that covers the cooling holes. The laser drilling apparatus collects data at the locations mapped to the macro file of the component having a new coating layer. A modification is made to the locations of the at least one cooling holes based on a parameter in the collected data. The laser drilling apparatus drills using the laser at the modified locations into the new coating layer.

4 Claims, 5 Drawing Sheets

(56)                    References Cited

U.S. PATENT DOCUMENTS

| | | | |
|---|---|---|---|
| 2006/0291716 A1* | 12/2006 | Vaidyanathan | G06V 30/144 |
| | | | 382/152 |
| 2013/0268107 A1 | 10/2013 | Bostanjoglo et al. | |
| 2015/0369059 A1* | 12/2015 | Burd | F01D 5/288 |
| | | | 427/140 |
| 2016/0243655 A1* | 8/2016 | Hu | B23K 26/04 |
| 2020/0001404 A1 | 1/2020 | Turcotte et al. | |

* cited by examiner

Figure 3:
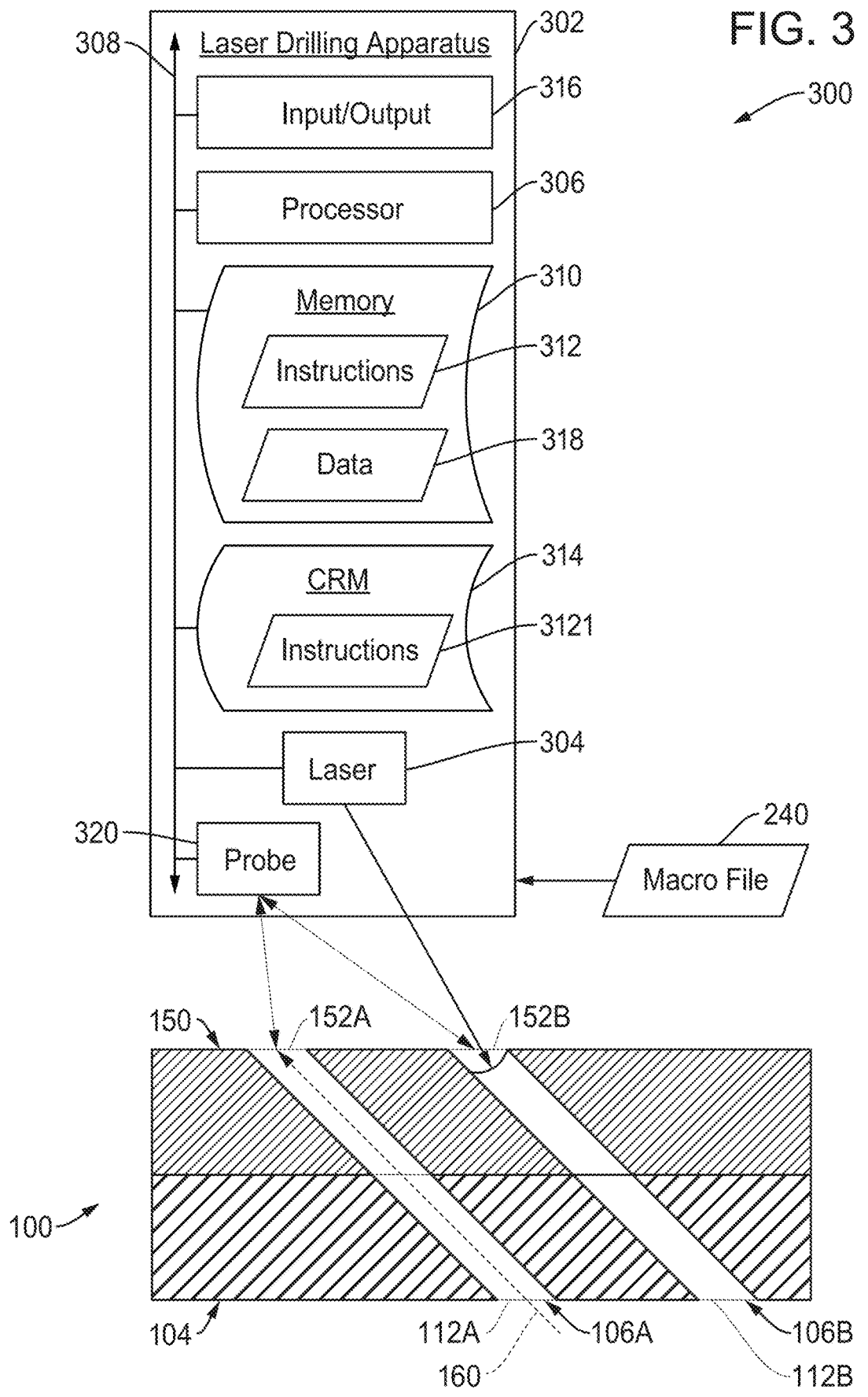

Laser Drilling Apparatus — 302

308

Input/Output — 316

Processor — 306

Memory — 310

Instructions — 312

Data — 318

CRM — 314

Instructions — 3121

Laser — 304

320 — Probe

Macro File — 240

150

152A    152B

100

104    112A    106A    106B 160    112B

400

402 — Strip Coating

404 — Inspect Cooling Hole Locations

406 — Map Component

408 — Generate Macro File

410 — Apply New Coating

412 — Load Macro File

414 — Inspect Surface

416 — Collect Data

418 — Modify Cooling Hole Positions

420 — Drill Cooling Holes

422 — Test Airflow

METHODS FOR RE-ESTABLISHING COOLING HOLES IN COMPONENTS HAVING DEFORMATION

FIELD OF THE INVENTION

The subject matter disclosed herein relates to re-establishing cooling holes in a component. In particular, the subject matter disclosed herein relates to using methods for reopening holes without damaging the existing holes.

BACKGROUND OF THE INVENTION

Components containing film cooling holes, such as divergent flaps or seals, turbine exhaust cases, and combustor liner panels, are not considered for a coating replacement repair due to the level of accuracy required to reopen the cooling holes. This issue may be made more difficult given that the parts are known to distort from the coating process. Some processes remove the coating, recoat the part that covers the cooling hole, and then installs a counterbore style hole in the coating. The counterbore style hole is larger in diameter than the cooling hole to reopen the hole that accounts for a level of inaccuracy in locating the hole.

A need may be appreciated for processes that reopen cooling holes having greater accuracy and do not damage the existing cooling holes.

SUMMARY OF THE INVENTION

The present disclosure is directed, in a first aspect, to a method for processing a gas turbine component. The method includes removing an existing coating layer from a substrate of the gas turbine component. The component includes at least one cooling hole within the existing coating layer and the substrate. The method also includes mapping a location of the at least one cooling hole in the component. The method also includes generating a macro file of the mapped location of the at least one cooling hole. The method also includes applying a new coating layer onto the substrate of the component. The new coating layer at least partially covers the at least one cooling hole. The method also includes collecting data at the mapped location about the component having the new coating layer. The method also includes modifying the mapped location of the at least one cooling hole based on the collected data. The method also includes drilling the new coating layer at the modified mapped location to re-establish the at least one cooling hole.

In yet another embodiment, the present disclosure is directed to a method for re-establishing cooling holes on a component is disclosed. The method includes generating a macro file of at least one mapped location of at least one cooling hole in a zone of a component. The component includes a substrate having the at least one cooling hole. The method also includes applying a new coating layer to the substrate of the component. The method also includes collecting data at the at least one mapped location of the component having the new coating layer. The method includes modifying the at least one mapped location of the at least one cooling hole specified by the macro file based on at least one parameter within the collected data. The method also includes drilling the new coating layer using a laser at the at least one mapped location as modified based on the at least one parameter.

In yet another embodiment, the present disclosure is directed to a system for processing a component. The system includes a coordinate measurement machine having a probe to determine at least one location on the component having a substrate. The at least one location corresponds to at least one cooling hole in the component. The system also includes a laser drilling apparatus having a laser. The laser drilling apparatus has a processor and a non-transitory storage device that includes instructions that, when executed by the processor, configures the processor to load a macro file from the coordinate measurement machine. The macro file includes the at least one location of the at least one cooling hole on the component. The instructions also configure the processor to collect data from the component having a new coating layer applied on the substrate. The data corresponds to the at least one location. The instructions also configure the processor to modify the at least one location for the at least one cooling hole within the component based on at least one parameter in the collected data. The instructions also configure the processor to drill the new coating layer with the laser at the at least one modified location to re-establish the at least one cooling hole within the component.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

FIG. 3 illustrates block diagram of a system for using a laser drilling apparatus to re-establish cooling holes in the component according to the disclosed embodiments.

DETAILED DESCRIPTION OF THE INVENTION

Figure 1A:
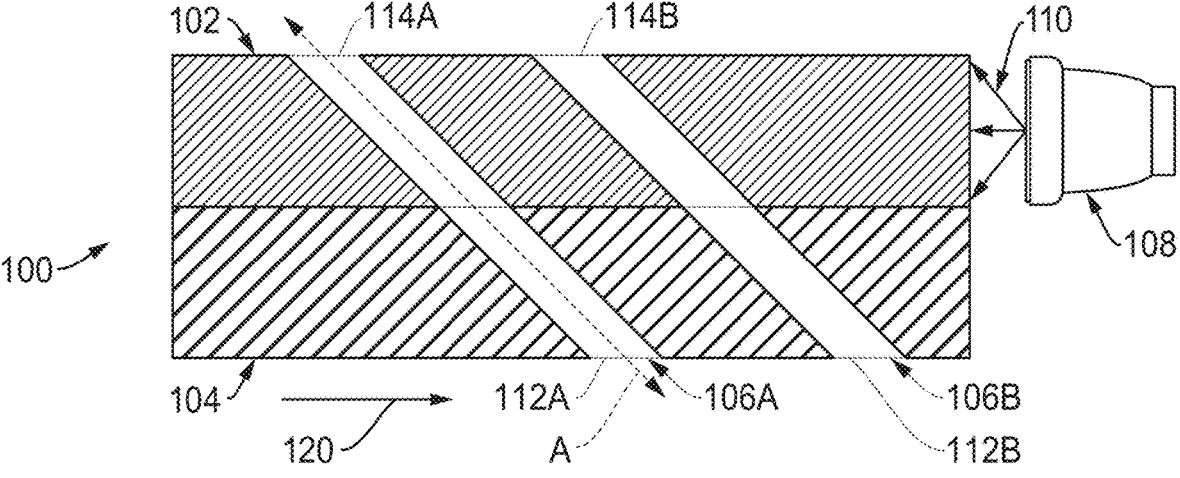
FIG. 1A illustrates a component at a stage of processing according to the disclosed embodiments.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

The present disclosure is directed to different methods of reopening the holes. The disclosed embodiments more precisely locate the holes without damaging the existing hole. They create similar geometry as the original equipment manufactured (OEM) hole, while accounting for any distortion. The creation of the similar geometry as the OEM holes should lead to meeting the same requirements as the OEM airflow and signature.

The disclosed embodiments use an optical sensor to locate the cooling holes after the coating is removed. Part surface location information also is collected while the coating is removed. The part is then recoated to cover the cooling holes. A macro file is generated that stores the serial number specific cooling hole locations and part surface information. The part is loaded onto a laser drill and the macro file for the specific serial number is loaded. A part probe on the laser drill is used to locate the part and measures the same part surface locations as in the uncoated state. The disclosed embodiments calculate the distortion of the part in all areas. The same surface mapping points that are measured in the precoat state are measured in the post coat state to determine how much the component has moved. The disclosed embodiments may determine how much a point for a cooling hole has moved after determining the coating thickness. The drilling positions are modified in order to account for the distortion. The cooling holes are redrilled using the macro file and distortion compensation values.

FIG. 1A depicts a component 100 at a stage of processing according to the disclosed embodiments. Component 100 may include existing coating 102 and substrate 104. Component 100 may be used in conjunction with engine components. More specifically, component 100 may be a gas turbine engine component. Substrate 104 may include a metal, such as nickel, steel, aluminum, and the like. One or more existing coatings 102 may be applied to substrate 104. Existing coating 102 may include one or more materials, such as a ceramic material or a metallic material. Existing coating 102 also may be known as an existing coating layer on substrate 104.

Cooling holes 106A and 106B are formed through substrate 104 and existing coating 102. The cooling holes may be comprised of two portions. For example, cooling hole 106A includes first portion 112A in substrate 104 and second portion 114A in existing coating 102. Cooling hole 106B includes first portion 112B in substrate 104 and second portion 114B in existing coating 102. Cooling holes 106A and 106B may be arranged about an axis A so that the cooling holes are co-axial. Air moves through cooling holes 106A and 106B during operations to provide cooling air.

Component 100 may include any number of cooling holes within substrate 104 and existing coating 102. Cooling holes 106A and 106B may be oriented at an angle relative to substrate 104 and existing coating 102. For example, cooling holes 106A and 106B are shown in FIG. 1A as being oriented at an angle relative a horizontal reference direction 120. The angle may be shown by the angle between axis A and horizontal reference direction 120. The angle may be between 30 degrees and 60 degrees and may be based on one or more parameters of component 100. For example, the parameters may be based on one or more specifications for substrate 104 or existing coating 102.

Similarly, a size or dimension of cooling holes 106A and 106B may be based on one or more parameters of component 100. Further, though cooling holes 106A and 106B are shown as being substantially cylindrical, other shapes or forms for the cooling holes may be used. Component 100 may be indicative of a configuration implemented by the OEM. Cooling holes 106A and 106B may be formed in component 100 following the application of existing coating 102 to substrate 104.

During coating replacement repair, waterjet device 108 may be used to strip existing coating 102 from substrate 104. This feature allows for replacement of existing coating 102 after it may be damaged during operations. It also may allow for repair or inspection of substrate 104. Waterjet 110 is applied to strip existing coating 102 without damaging substrate 104.

Figure 1B:
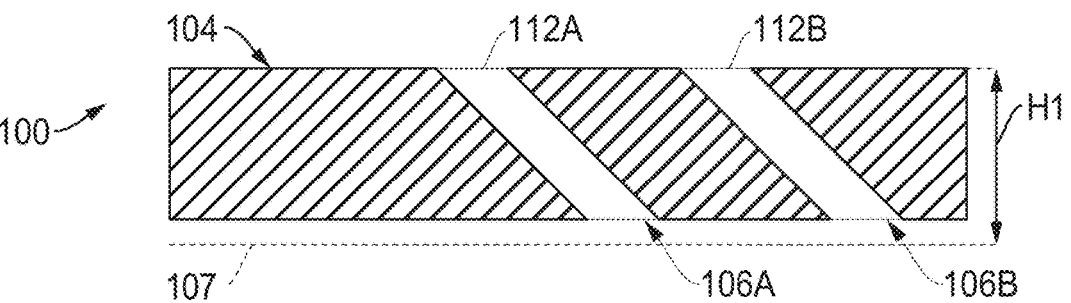
FIG. 1B illustrates the component at another stage of the processing according to the disclosed embodiments.

Referring to FIG. 1B, component 100 is shown with existing coating 102 removed. At this point, an optical inspection may be performed of the locations of cooling holes 106A and 106B. Cooling holes 106A and 106B includes portions 112A and 112B but not portions 114A and 114B as those portions were removed with existing coating 102. Further, a coordinate measurement machine (CMM) inspection may be performed of the surface of substrate 104 in various locations to map the original state of cooling holes 106A and 106B, as well as other cooling holes within the substrate. The CMM also determines a height H1 of component 100 with existing coating 102 removed. Height H1 may be the distance between a reference plane 107, such as the bottom surface of component 100 or a surface of an item holding component 100. Reference plane 107 should be the same for all locations on the upper surface of component 100.

Figure 2:
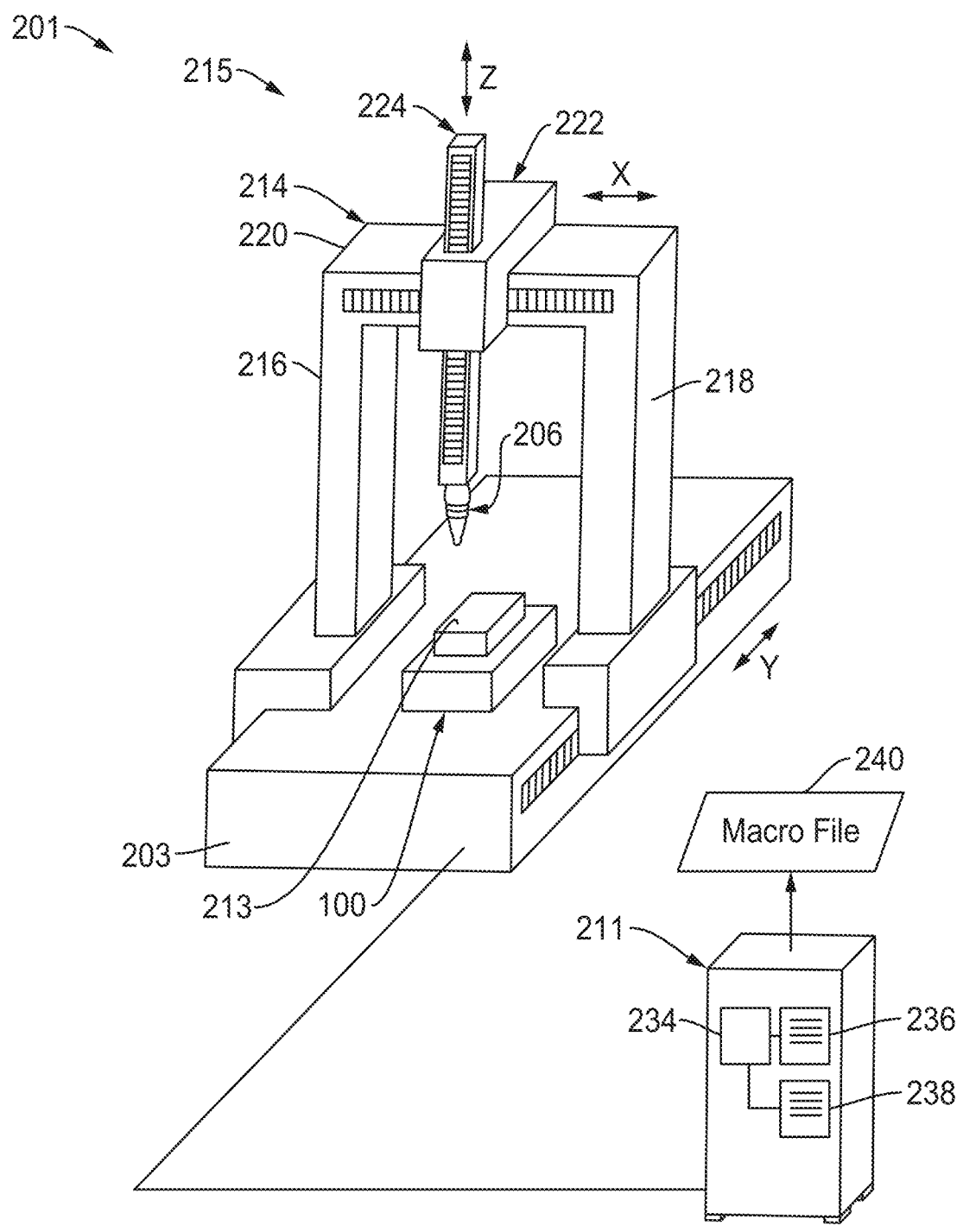
FIG. 2 illustrates an example coordinate measurement machine according to the disclosed embodiments.

FIG. 2 depicts an example CMM 201 for inspecting component 100 according to the disclosed embodiments. At this stage, component 100 may include substrate 104 having cooling holes 106A and 106B. CMM 201 may include a frame structure 215 for linking probe head 206 to base 203. Frame structure 215 includes frame components 214, 222, and 224 being movable with respect to each other.

Frame component 214 of CMM 201 is arranged on base 203 so that it can be moved in a longitudinal, or Y, direction. Frame component 214 includes two portal legs 216 and 218 that are connected by a bridge 220 at their upper ends. Frame component 222 may include an X-carriage that can be driven along bridge 220 in an X direction. Frame component 224 may be a ram or Z-column that can be shifted in a third space, or Z, direction. Frame component 224 may be supported in the Z direction by bearings that are integral with frame component 222. The three space directions X, Y, and Z may be orthogonal to each other.

CMM 201 determines the three space coordinates of a measurement point 213 on component 100. In some embodiments, CMM 201 may use three drive mechanisms to move probe head 206 relative to base 203 in the three space directions of X, Y, and Z. Each linear drive mechanism may have a linear guide. Each linear drive mechanism also includes a movable member being supported for movement. Each linear drive mechanism also includes a linear measuring instrument for determination of a first, second, or third drive position, respectively, of each movable member in the X, Y, or Z direction.

Probe head 206 is fastened on the lower free end of frame component 224. An optical sensor may be arranged on probe head 206 to be used in a manner to determine locations of the cooling holes therein. CMM 201, however, is not limited to an optical sensor and may implement embodiments in which a measurement point is approached in a tactile manner, for example, with a stylus that touches the locations on component 100. Further, probe head 206 may include a capacitance, or inductance probe.

CMM 201 may include control and calculation unit 211 that is designed to actuate the motor drives of CMM 201 so that probe head 206 is moved to measurement point 213. Control and calculation unit 211 includes at least one processor 234 and a plurality of memories 236 and 238. Using processor 234 and memories 236 and 238, control and calculation unit 211 is configured to determine the three space coordinates of measurement point 213 on component 100 as a function of at least the first, the second, and the third drive positions of the drive mechanisms supported by frame components 214, 222, and 224.

Control and calculation unit 211 also generates macro file 240 of the hole locations of the cooling holes in component 100, such as cooling holes 106A and 106B. Macro file 240 is specific to component 100. For example, locations of cooling holes 106A and 106B may be specified with respect to a serial number or other tracking identifier of component 100. Alternatively, the location of cooling holes 106A and 106B may be based on a make or model of component 100 or on one or more other features of component 100, such as an external edge or surface. Macro file 240 may be used to automate further processing of component 100.

Zones may be defined on component 100 as well, such that macro file 240 further defines the locations of the cooling holes by the zones. Macro file 240 also may define surface height of component 100 for the zone. For example, a zone may be 1 inch by 1 inch, 5 centimeters by 5 centimeters, and the like. Locations of cooling holes are determined within the zone along with a surface height of the zone, as detected by CMM 201. Thus, CMM 201 is collecting both the location of all cooling holes in component 100 and also mapping the surface by taking one or more data points on the surface in each zone. CMM 201 determines a height H1 for the data points on the surface in relation to reference plane 107. Different zones may have different heights H1 due to variances within component 100.

Figure 1C:
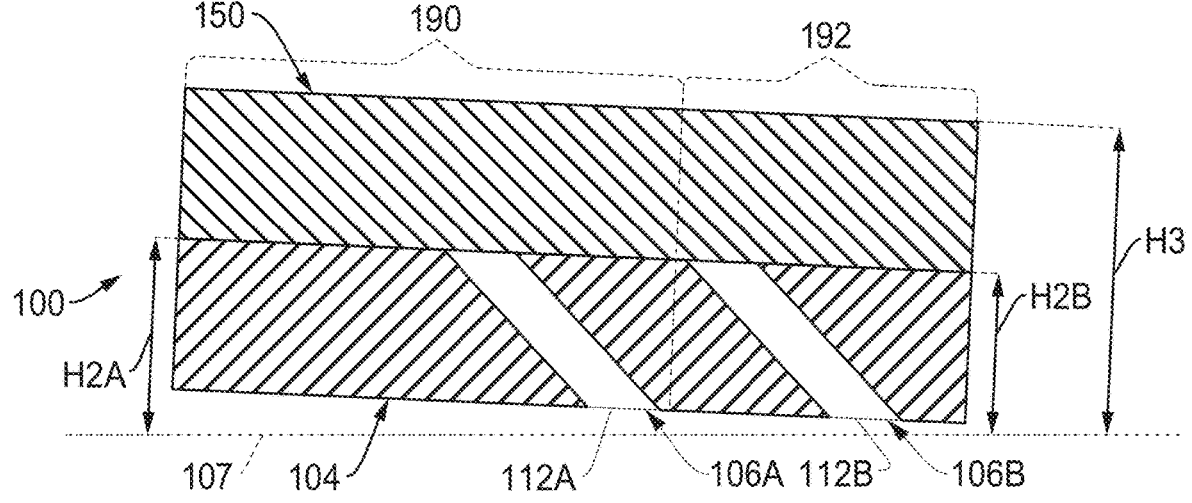
FIG. 1C illustrates the component at another stage of the processing according to the disclosed embodiments.

Referring to FIG. 1C, the disclosed embodiments recoat component 100. New coating 150 may be of the same material as existing coating 102. New coating 150 may be known as a new coating layer. Essentially, the coating on substrate 104 is restored. As shown in FIG. 1C, a portion of new coating 150 in proximity to cooling holes 106A and 106B at least partially block the cooling holes. Further, at least part of new coating 150 may adhere to the sidewalls of portions 112A and 112B of cooling holes 106A and 160B, respectively. A blocking of cooling holes 106A and 106B includes at least a partial or complete obstruction of the cooling holes that precludes a flow of air or a fluid through substrate 104 and new coating 150.

As disclosed in greater detail in FIG. 3, a probe 320 is used to determine distortions, shifts, or other variances that may have occurred during application of new coating 150. The mapped locations of the data points on the surface of component 100 captured by CMM 201 are referenced by probe 320 on new coating 150. Accounting for Height H3 between an upper surface of new coating 150 and reference plane 107, height values for the data point locations may be determined to account for the distortion in the surface of substrate 104 during the application of the new coating. More than one height H3 may be measured.

For example, cooling hole 106A may be in a first zone 190 and cooling hole 106B may be in a second zone 192. Probe 320 determines a height H2A for first zone 190 between reference plane 107 and the upper surface of substrate 104 at a data point location in the first zone. It also determines a height H2B for second zone 192 between reference plane 107 and the upper surface of substrate 104 at a data point location in the second zone. As disclosed below, height H2A may be a parameter used in modifying the mapped location of cooling hole 106A in first zone 190, as stored in macro file 240. Height H2B may be a parameter used in modifying the mapped location of cooling hole 106B in second zone 192, also stored in macro file 240.

Referring back to FIG. 1B, a comparison with the position of component 100 shows that the surfaces of the component has shift in relation to reference plane 107. The distortion or shift caused by the application of new coating 150 must be accounted for in drilling operations. As can be appreciated, the performance of drilling operations at the locations shown in FIG. 1B would result in damage to cooling holes 106A and 106B as well as component 100. The disclosed embodiments account for this distortion.

Figure 1D:
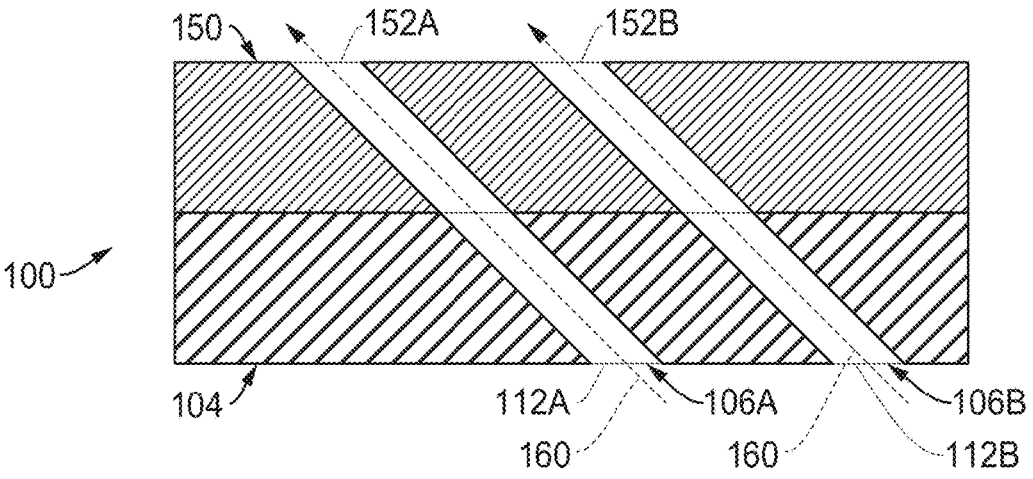
FIG. 1D illustrates the component at another stage of the processing according to the disclosed embodiments.

The disclosed embodiments re-establish cooling holes 106A and 106B in their entirety. Referring to FIG. 1D, cooling holes 106A and 106B include portions 152A and 152B in new coating 150 that allows air 160 to flow through component 100. A laser drill apparatus, disclosed in greater detail below, may drill through new coating 150 to form portions 152A and 152B. Portions 152A and 152B are similar in geometry to portions 112A and 112B. Thus, the new cooling hole arrangement does not include much, if any, deformation, especially in new coating 150. Cooling holes 106A and 106B may be tested by having air 160 flowed therethrough.

Referring to FIG. 3, a system 300 for using a laser drilling apparatus 302 to re-establish cooling holes 106A and 106B is disclosed. Laser drilling apparatus 302 includes laser 304. Laser 304 generates beam 305 to remove existing coating 150 from substrate 104 as instructed by at least one processor 306 over data bus 308. Laser 304 may be controlled to only remove existing coating 150 to form portions 152A and 152B. For example, parameters of laser 304 may be regulated. These parameters include the total number of laser pulses applied during drilling, laser power, pulse width of beam 305, spot size, and the like.

In addition to at least one processor 306, laser drilling apparatus 302 includes a memory 310. Memory 310 may store instructions 312 that, when executed by processor 306, cause laser drilling apparatus 302 to perform one or more operations, as disclosed here and in FIG. 4 below. At least a portion of instructions 312, shown as instructions 3121, may be stored on computer-readable medium (CRM) 314. CRM 314 may be a non-transitory CRM. Instructions 3121 of CRM 314 may be used as an alternative to, or in conjunction with, the use of instructions 312 stored in memory 310. One or both of memory 310 and CRM 314 may be referred to as a storage device.

Laser drilling apparatus 302 also includes one or more input/output devices 316. I/O devices 316 may provide an interface between laser drilling apparatus 302 and one or more components or devices, such as control and calculation unit 211 of CMM 201. For example, I/O devices 316 may receive macro file 240 that is generated by CMM 201. I/O devices 316 also may be used to output data in one or more formats.

Memory 310 may store data 318. Data 318 may include an identification of one or more of a type, material, or thickness of coating used, either existing coating 102 or new coating 150. It also may store the type or material used for substrate 104. Macro file 240 may be added to data 318 to provide the information generated by CMM 201 on the location of cooling holes in component 100 and other information.

Laser drilling apparatus 302 also includes probe 320. Probe 320 also may be coupled to processor 306 by data bus 308. Probe 320 inspects the surface of component 100 in various locations to map the component in the coated state, or with new coating 150. Specifically, probe 320 measures a height of an upper surface of component 100 at the one or more data points collected by CMM 201 for each zone. Data is collected after new coating 150 is applied by probe 320. Using the example disclosed above, heights H2A and H2B for the different data points are determined based on any distortions, movement, or shifts caused by the application of new coating 150. This information is used to determine how much each hole has moved in the processed component. The collected data also may be stored in data 318 of memory 310.

Laser drilling apparatus 302 drills portions 152A and 152B for cooling holes 106A and 106B, respectively, using macro file 240 and the data collected by probe 320. Macro file 240 is loaded onto apparatus 302 to identify the locations of the cooling holes in component 100 by serial number or other identification. As disclosed above, macro file 240 includes the X, Y, and Z coordinates of the cooling holes in the identification component or part of the component. The data collected by probe 320 regarding the new coating is used to further adjust these locations and angles for drilling. The data collected for the heights of the data points captured by probe 320 is used to modify the mapped locations provided by macro file 240. Processor 306 then instructs laser 304 to apply beam 305 to the updated locations on component 100 to re-establish the cooling holes, such as cooling holes 106A and 106B.

Figure 4:
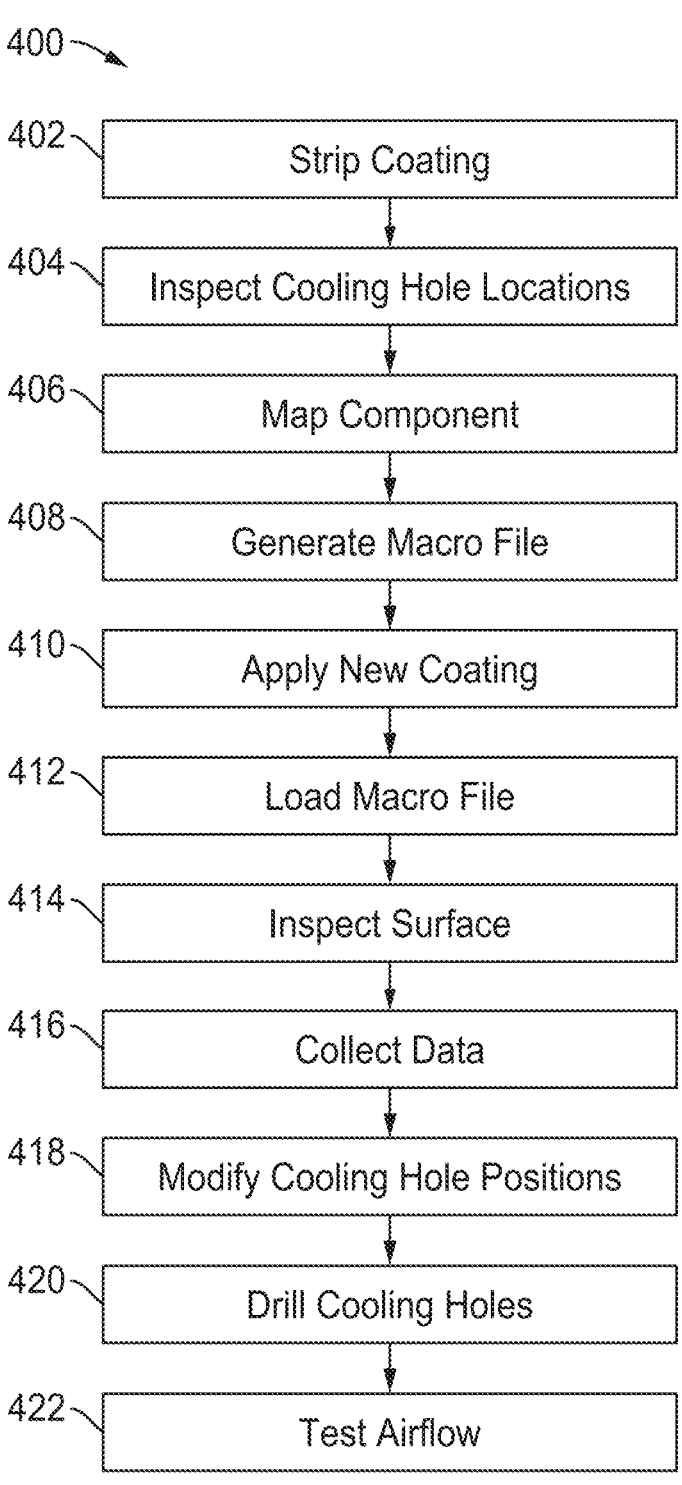
FIG. 4 illustrates a flowchart for re-establishing cooling holes in the component according to the disclosed embodiments.

FIG. 4 depicts a flowchart 400 for re-establishing cooling holes 106A and 106B in component 100 according to the disclosed embodiments. Flowchart 400 may refer to FIGS. 1A to 3 for illustrative purposes. Flowchart 400, however, is not limited to the embodiments disclosed by FIGS. 1A to 3.

Step 402 executes by stripping existing coating 102 from component 100. In some embodiments, waterjet device 108 applies a waterjet 110 to strip away existing coating 102. After this step, component 100 may only include substrate 104 having cooling holes 106A and 106B. Step 404 executes by inspecting the locations of cooling holes 106A and 106B. The inspection may be an optical inspection. The optical inspection may determine the X, Y, and Z location of every single cooling hole in component 100.

Step 406 executes by mapping component 100 by CMM 201. CMM 201 may perform inspection operations of the surface of component 100, or substrate 104, in various locations to map its original state. Referring back to FIG. 2, CMM 201 may use probe head 206 to collect this information. Component 100 may be broken into zones. Information about each zone may be collected, including its position and the location of cooling holes. Probe head 206 may be an optical probe that collects the location of features on component 100 using X, Y, and Z coordinates. Further, probe head 206 takes a data point in each zone on the surface of component 100 in addition to collected the locations of the cooling holes. Referring to FIG. 1B, heights H1 may be determined based on a reference plane 107 and an upper surface of substrate 104 at the one or more data points within each zone.

Step 408 executes by generating macro file 240, as disclosed above. CMM 201 may generate macro file 240 using the collected data from probe head 206 about component 100 as well as a serial number, identification number, make, model, and the like about the component. Macro file 240 may be made available to other components. Step 410 executes by applying new coating 150 to substrate 104. Component 100 is recoated but does not include portions within new coating 150 to allow air to flow through cooling holes 106A and 106B. In other words, cooling holes 106A and 106B are not established in new coating 150. Further, during application of new coating 150, distortions may occur within substrate 104. One or more portions of substrate 104 may rotate in relation to reference plane 107. Substrate 104 may shift laterally. Attempts to drill cooling holes by laser drilling apparatus 302 may cause damage to cooling holes 106A and 106B.

Step 412 executes by loading macro file 240 onto laser drilling apparatus 302. Macro file 240 is specific to the serial number, identification number, and the like to call out which component 100 is being processed or which location on the component is being processed. In some embodiments, several macro files 240 may be loaded onto laser drilling apparatus 302 for several components or several zones on one or more components. An operator may make sure the serial number of the component matches the applicable macro file.

Step 414 executes by inspecting the surface of component 100 having new coating 150. Probe 320 of laser drilling apparatus 302 inspects the surface or surfaces for component 100 to map parameters of the component in the recoated state. Probe 320 may be used at the data points determined by CMM 201 for the zones on the surface of component 100 that now includes new coating 150. Step 416 executes by collecting data about the surface of component 100 in various locations. Probe 320 may collect information on the height of new coating 150 as at the location of the various data points determined on the surface of component 100 after recoating.

Step 418 executes by modifying the positions for the cooling holes in component 100 based on the distortion caused by new coating 150. Component 100 having new coating 150 may have a height H3. The disclosed embodiments may execute a process to determine a modification factor to modify the locations for drilling new coating 150 to form portions 152A and 152B for cooling holes 106A and 106B, respectively, based on these heights that correspond to the changed height of the upper surface of substrate 104 in relation to reference plane 107 at data point locations corresponding to new cooling holes 106A and 106B. Once the modification factor is determined, it is provided back to laser drilling apparatus 302 to update or modify the data from macro file 240 to change where laser 304 applies beam 305 to laser drill portions 152A and 152B into new coating 150.

For example, the surface of component 100 may include first zone 190 having cooling hole 106A and second zone 192 having cooling hole 106B. CMM 201 maps the location of the cooling holes in each zone using the X, Y, and Z coordinates for the holes. In addition, CMM 201 determines a data point for at least one surface location in each zone. A height H1 may be determined at each data point that relates to a distance from a reference plane 107, such as a surface holding component 100 or a bottom surface of the component. Thus, a parameter for the height of at least two data points for surface locations are collected, at least one for each zone.

During re-establishing of the cooling holes after new coating 150 is applied, probe 320 of laser drilling apparatus 302 is used to determine a parameter at the data points for the surface locations in the zones as captured in macro file 240. This parameter may be the height of an upper surface of the new coating in these locations. Using the captured heights, any distortion in the height of the upper surface of substrate 104 may be determine. For example, the height of new coating 150 may be used to determine the shift in the height of the upper surface of substrate 104. The data point in the first zone may include a height H2A of 2.1 centimeters (cm). The data point in the second zone may include a height H2B of 2.3 cm. If multiple data points are measured within a zone, then the parameter for that zone may be some value based on all the determined heights, such as an average value. Thus, laser drilling apparatus 302 takes these differences in height within the zones when determining the modification factor. Laser drill apparatus may determine two different modification factors to adjust the drilling locations for the cooling holes in the respective zone.

Step 420 executes by drilling new coating 150 by laser 304 to form portions 152A and 152B to re-establish cooling holes 106A and 106B, respectively. Using the modification factor determined in step 418, the position of beam 305 is compensated for the difference between existing coating 102 and new coating 150. If this compensation is not made, then laser 304 may form portions 152A and 152B that do not line up with portions 112A and 112B in substrate 104. Further, additional new coating 150 may be removed during the drilling, which causes further damage to cooling holes 106A and 106B. It also may damage substrate 104.

Step 422 executes by testing the airflow through the re-established cooling holes in component 100. Cooling holes 106A and 106B may be re-established having portions 106A and 106B along with portions 152A and 152B, respectively. Air 160 may flow through component 100. Further, cooling holes 106A and 106B have consistent geometry through portions 112A and 152A and portions 112B and 152B.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method for re-establishing cooling holes on a component, the method comprising:

stripping an existing coating layer from a component;

generating a macro file of at least one mapped location of at least one cooling hole in a zone of the component, wherein the component includes a substrate having the at least one cooling hole and determining a first parameter corresponding to the component;

applying a new coating layer to the substrate of the component;

collecting data at the at least one mapped location of the component having the new coating layer and determining a second parameter corresponding the component and the application of the new coating layer;

determining a modification factor for the component based on the first parameter and the second parameter;

modifying the at least one mapped location of the at least one cooling hole specified by the macro file based on the modification factor; and drilling the new coating layer using a laser at the at least one mapped location as modified based on the modification factor, wherein the first parameter corresponds to a height of the component prior to the application of the new coating layer, wherein the second parameter corresponds to a height of the component and the new coating layer.

2. The method of claim 1, further comprising mapping the at least one mapped location of the at least one cooling hole using a coordinate measurement machine to generate the macro file.

3. The method of claim 1, further comprising loading the macro file onto a laser drilling apparatus having the laser.

4. The method of claim 1, wherein the modification factor relates to a shift caused by applying the new coating layer at the mapped location.

* * * * *